(12) United States Patent  
Watt et al.

(10) Patent No.: US 9,691,171 B2
(45) Date of Patent: Jun. 27, 2017

(54) VISUALIZATION TOOL FOR PARALLEL DEPENDENCY GRAPH EVALUATION

(71) Applicant: DreamWorks Animation LLC, Glendale, CA (US)

(72) Inventors: Martin Peter Watt, Glendale, CA (US); Brendan Duncan, Redwood City, CA (US)

(73) Assignee: DreamWorks Animation LLC, Glendale, CA (US)

( * ) Notice: Subject to any disclaimer, the term of this patent is extended or adjusted under 35 U.S.C. 154(b) by 297 days.

(21) Appl. No.: 13/797,895

(22) Filed: Mar. 12, 2013

(65) Prior Publication Data

US 2014/0035922 A1    Feb. 6, 2014

(51) Int. Cl.
*G06T 13/40* (2011.01)
*G06T 19/20* (2011.01)
(Continued)

(52) U.S. Cl.
CPC ............ *G06T 13/40* (2013.01); *G06F 11/323* (2013.01); *G06T 11/206* (2013.01); *G06T 13/20* (2013.01); *G06T 19/20* (2013.01); *G06F 9/44* (2013.01); *G06T 2210/52* (2013.01); *G06T 2219/2016* (2013.01)

(58) Field of Classification Search
CPC ......... G06T 13/00; G06T 13/20; G06T 13/40; G06T 19/20; G06T 11/206; G06T 2210/52; G06T 2219/2016; G06F 11/323; G06F 2009/4441
See application file for complete search history.

(56) References Cited

U.S. PATENT DOCUMENTS

| | | | |
|---|---|---|---|
| 5,168,554 A * | 12/1992 | Luke | 715/209 |
| 6,111,582 A | 8/2000 | Jenkins | |
| 6,226,787 B1 | 5/2001 | Serra et al. | |
| 6,275,956 B1 | 8/2001 | On et al. | |

(Continued)

OTHER PUBLICATIONS

Broberg, Magnus, et al. "Performance Optimization Using Extended Critical Path Analysis in Multithreaded Programs on Multiprocessors" J. Parallel & Distributed Computing, vol. 61, issue 1, pp. 115-136 (2001) available from <http://www.sciencedirect.com/science/article/pii/S0743731500916678>.*

(Continued)

*Primary Examiner* — Kamini S Shah
*Assistant Examiner* — Jay B Hann
(74) *Attorney, Agent, or Firm* — Morrison & Foerster LLP

(57) ABSTRACT

Systems and processes providing a tool for visualizing parallel dependency graph evaluation in computer animation are provided. Runtime evaluation data of a parallel dependency graph may be collected, including the start time and stop time for each node in the graph. The visualization tool may process the data to generate performance visualizations as well as other analysis features. Performance visualizations may illustrate the level of concurrency over time during parallel dependency graph evaluation. Performance visualizations may be generated by graphing node blocks according to node start time and stop time as well as the level of concurrency at a given time to illustrate parallelism. Performance visualizations may enable character technical directors, character riggers, programmers, and other users to evaluate how well parallelism is expressed in parallel dependency graphs in computer animation.

23 Claims, 8 Drawing Sheets

(51) Int. Cl.
*G06F 11/32* (2006.01)
*G06T 11/20* (2006.01)
*G06T 13/20* (2011.01)
*G06F 9/44* (2006.01)

(56) References Cited

U.S. PATENT DOCUMENTS

| | | | |
|---|---|---|---|
| 6,434,714 | B1 | 8/2002 | Lewis et al. |
| 7,698,686 | B2 | 4/2010 | Carroll et al. |
| 8,015,564 | B1 | 9/2011 | Beyer et al. |
| 8,286,135 | B2 | 10/2012 | DeRose et al. |
| 8,869,148 | B2 * | 10/2014 | Dube ............... G06F 11/3442 718/101 |
| 2007/0198971 | A1 | 8/2007 | Dasu et al. |
| 2008/0256339 | A1 * | 10/2008 | Xu et al. ............... 712/216 |
| 2009/0289939 | A1 | 11/2009 | Peterson et al. |
| 2010/0123723 | A1 | 5/2010 | Collard et al. |
| 2010/0214313 | A1 | 8/2010 | Herman et al. |
| 2010/0324867 | A1 | 12/2010 | Mital et al. |
| 2010/0324870 | A1 | 12/2010 | Beckman et al. |
| 2011/0060704 | A1 | 3/2011 | Rubin et al. |
| 2011/0067016 | A1 | 3/2011 | Mizrachi et al. |

OTHER PUBLICATIONS

Labarta, Jesus, et al. "DiP: A Parallel Program Development Environment" Euro-Par'96 Parallel Processing, Lecture Notes in Computer Science, vol. 1124, pp. 665-674 (1996) available from <http://link.springer.com/chapter/10.1007/BFb0024763>.*
Broberg, et al. "VPPB—A Visualization and Performance Prediction Tool for Multithreaded Solaris Programs" IEEE Parallel Processing Symposium, pp. 770-776 (1998) available from <http://ieeexplore.ieee.org/xpls/abs_all.jsp?arnumber=670014>.*
Michael T. Heath & Jennifer E. Finger "ParaGraph: A Performance Visualization Tool for MPI" (2003) available at <http://www.csar.illinois.edu/software/paragraph/userguide.pdf>.*
Gerald Tomas & Christoph W. Ueberhuber "Visualization of Scientific Parallel Programs" (1994), pp. 48-49.*
Broberg et al., "Visualization and Performance Prediction of Multithreaded Solaris Programs by Tracing Kernel Threads", Department of Software Engineering and Computer Science, University of Karlskrona/Ronneby, 1999, 7 pages.
International Search Report and Written Opinion received for PCT Patent Application No. PCT/US2014/025013, mailed on Aug. 5, 2014, 11 pages.
International Preliminary Report on Patentability received for PCT Patent Application No. PCT/US2014/025013, mailed on Sep. 24, 2015, 10 pages.
Kalyanachakravarthy, Banda,"Visualizing the MPI Programs: Using the Continuous Semantic Zooming", Computer Science Technical Reports, 2008, 75 pages.

* cited by examiner

VISUALIZATION TOOL FOR PARALLEL DEPENDENCY GRAPH EVALUATION

BACKGROUND

1. Field

This application relates generally to visualization tools for computer processes and, more specifically, to computer systems and processes for visualizing the state of parallel dependency graph evaluation in computer animation.

2. Related Art

Visualization tools are available for displaying a graphical representation of the performance of a computer program. For example, traditional visualization tools may provide a heat map that aids programmers, among others, to identify the most expensive, lengthy processes or functions that account for longer program runtimes and decreased user satisfaction. A programmer may then focus on optimizing the most expensive, lengthy processes or functions so as to have the greatest impact on decreasing runtime and improving user satisfaction.

However, while traditional visualization tools may be helpful for serial processes, they are less helpful and may even be misleading for multithreaded programs with processes running in parallel. To take advantage of multi-core processors capable of processing two, four, eight, twelve, sixteen, or more threads in parallel, programmers, among others, are designing programs with multiple threads that can run simultaneously, thereby decreasing runtime and improving overall performance. Traditional visualization tools may identify lengthy processes running on each of the multiple cores, but optimizing those processes may, in fact, have little or no impact on a program's overall runtime, thereby misleading programmers and wasting time.

For example, a lengthy process may run concurrently with a chain of serially dependent processes that run for a longer period of time than the concurrently running lengthy process. Traditional visualization tools may suggest that optimizing the lengthy process will decrease overall runtime when, in fact, it will have no effect on the overall runtime since the serially dependent processes running concurrently, despite each being shorter in duration, together are of a longer duration. In such a case, optimization efforts should be directed at the serially dependent processes, but current visualization tools may not lead to that conclusion.

Optimization concerns are especially pertinent in the area of computer animation, where hundreds of thousands of animation frames may be processed to create the complex and detailed scenes in today's animated films. Character technical directors, character riggers, and the like may develop a dependency graph to render, animate, or otherwise describe a scene in an animation. A dependency graph may be made up of interconnected nodes, each of which may be a standalone computation unit that takes in data via one or more input attributes, performs some computation on the data, and produces one or more output attributes. The connections in the graph may represent data flowing from one node to the next, with each node performing some computation on the data it receives to generate its output. A node may have multiple inputs and multiple outputs, as well as other attributes.

Many nodes may be computed simultaneously on multiple processor cores, but computing chains of nodes, each depending on the last, may require significant processing time. Optimization efforts should, therefore, be directed at those chains of nodes that directly impact the time it takes to evaluate a dependency graph. However, traditional visualization tools may lead character technical directors, character riggers, and the like to focus on optimizing non-critical nodes rather than the key nodes that directly impact the time it takes for the dependency graph to evaluate.

Thus, an improved visualization tool for parallel dependency graphs (as well as other multithreaded computer processes) is desired.

SUMMARY

Systems and processes for generating a performance visualization of a parallel dependency graph are described. A data file may be received that includes runtime evaluation entries for nodes in a parallel dependency graph. Runtime evaluation entries may include node identification and runtime duration. The concurrency level for each node in the parallel dependency graph may be determined based on the number of concurrently executing nodes in the data file. A node block may be generated for each of the nodes in the parallel dependency graph. The size and the position of each of the node blocks may be determined based on the concurrency level and runtime duration of each corresponding node. A performance visualization may be generated with some or all of the node blocks with sizes and at positions as determined from the concurrency level and runtime duration of the corresponding nodes.

A request may be received for characteristics of a particular node block in the performance visualization. In response to receiving the request for characteristics, the corresponding node identification, start time, and stop time may be provided for the particular node block. The upstream derivation and downstream progeny may also be identified and provided for the particular node block. A display property of node blocks may also be changed based on the upstream derivation and downstream progeny. A critical path of nodes through the parallel dependency graph may also be determined based on a chain of nodes in the parallel dependency graph with the longest runtime duration. The position of node blocks in the performance visualization may be determined based on the critical path of nodes through the parallel dependency graph. A display property of node blocks may also be changed based on the critical path of nodes.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1:
FIG. 1 illustrates an exemplary computer-generated animation scene.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to a visualization tool for generating a performance visualization of parallel dependency graphs in computer animation. As part of the computer animation process, character technical directors, character riggers, and the like may develop a dependency graph, which may be used to render, animate, or otherwise describe a scene in an animated film. A dependency graph may consist of interconnected nodes, each of which is a standalone computation unit that takes in data via one or more input attributes, performs some computation on the data, and produces one or more output attributes. Many dependency graph nodes may be computed simultaneously on multiple processor cores.

An exemplary visualization tool may include a computer program that generates performance visualizations, statistics, and the like from runtime analysis data of a parallel dependency graph. The data may include identifying information for the nodes in the parallel dependency graph, along with the runtime execution start time and stop time of each node. The exemplary visualization tool may analyze the data and generate a performance visualization that graphically illustrates the level of concurrency during parallel dependency graph evaluation (e.g., how well parallelism is expressed in a parallel dependency graph or how well a parallel dependency graph utilizes multiple processing cores). The tool may also generate statistics and a variety of different graphical illustrations for analyzing parallel dependency graphs.

A software programmer, program designer, technical director, or the like may then use the performance visualization, statistics, and other illustrations to visualize data flow and analyze the performance of a parallel dependency graph, in particular how well the parallel dependency graph is structured for parallel execution. Optimizations can then be directed to those nodes that directly impact overall runtime as illustrated in the performance visualization. Additionally, the ordering or structure of a parallel dependency graph may be modified to express more parallelism and reduce overall runtime by focusing on areas in the performance visualization with extra parallel capacity. Similarly, new nodes may be inserted into areas of a parallel dependency graph where the performance visualization illustrates free parallel capacity during evaluation.

Thousands of nodes may be required to describe and animate a single frame of a film, so optimizing performance by expressing parallelism may be vital for an efficient computer animation experience. A performance visualization tool that illustrates concurrency may thus be particularly helpful to character technical directors, character riggers, and the like to improve performance of parallel dependency graphs, thereby reducing runtime delays in the computer animation process. Given the particular impact such a tool may have in computer animation, the various embodiments herein are described using the example of a parallel dependency graph in the computer animation field. However, the various embodiments may be used to analyze virtually any type of multithreaded computer program or process, and the embodiments should accordingly be recognized as having applicability beyond computer animation.

Figure 2:
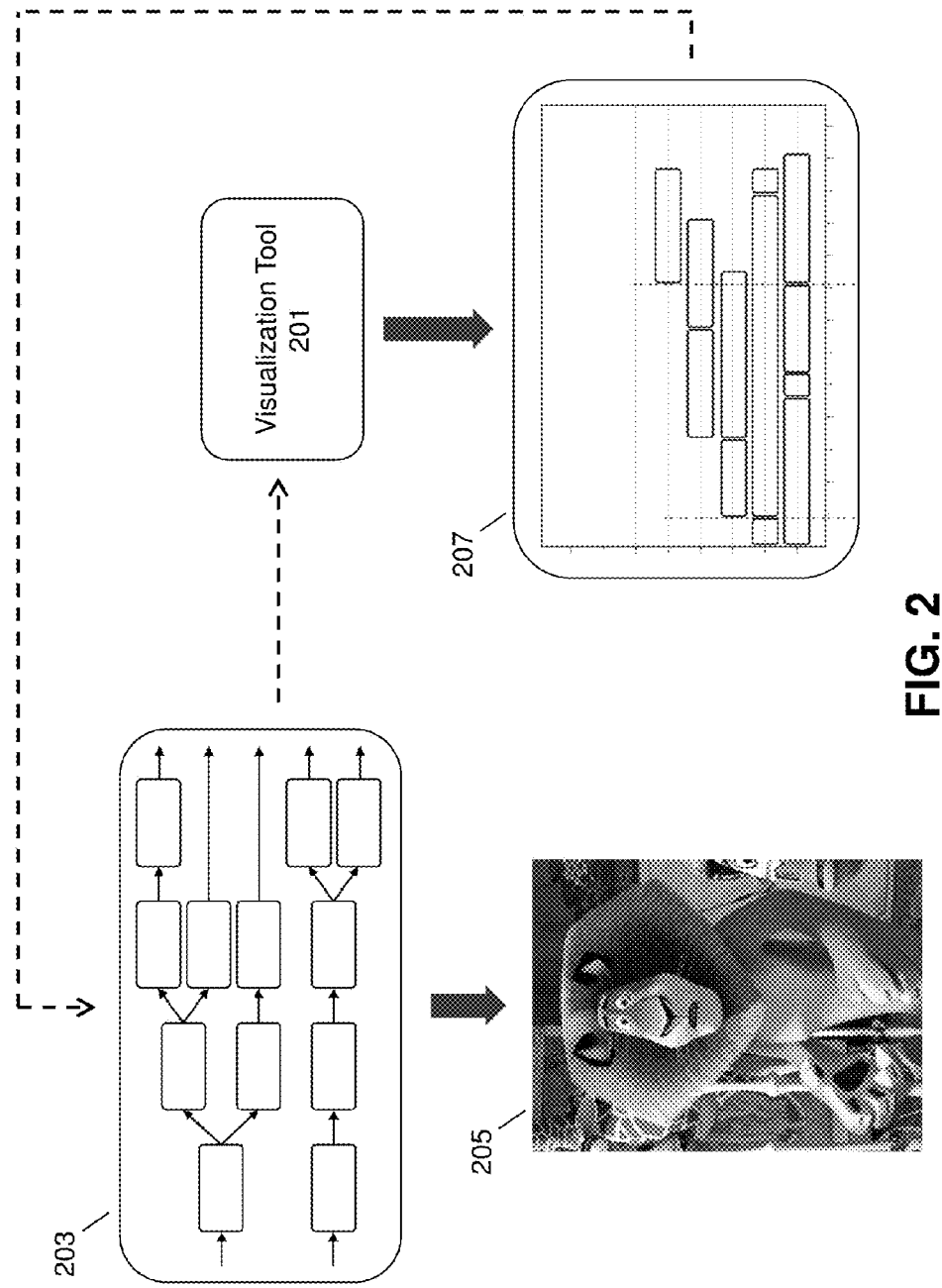
FIG. 2 illustrates an exemplary visualization tool that may be used to optimize parallel dependency graph evaluation in computer animation.

FIG. 1 illustrates an exemplary computer-generated animation scene. Notably, the scene includes a significant amount of detail that may correspond to a significant amount of computation time in rendering the scene (e.g., detailed facial expressions, fur, whiskers, lion's mane, etc.). FIG. 2 illustrates exemplary visualization tool 201 that may be used to optimize the computer animation processes used to generate a scene like that of FIG. 1. Parallel dependency graph 203 may be made up of multiple nodes that perform computations on scene data inputs to produce output attributes that (at least partially) generate animated scene 205. An exemplary parallel dependency graph is described in further detail below with reference to FIG. 3. Evaluation data may be collected from parallel dependency graph 203 and used as an input to visualization tool 201. For example, the start time and stop time of each node in parallel dependency graph 203 may be collected and received as an input to visualization tool 201. Visualization tool 201 may analyze the evaluation data and generate performance visualization 207 to, among other things, illustrate how well parallelism is expressed in parallel dependency graph 203. Exemplary performance visualizations are described in further detail below with reference to FIG. 5 and FIG. 6. Likewise, exemplary processes for generating a performance visualization of a parallel dependency graph evaluation are described in further detail below with reference to FIG. 7A and FIG. 7B.

Performance visualization 207 may be used by technical directors, character riggers, software programmers, and the like to modify and optimize parallel dependency graph 203. For example, performance visualization 207 may include an area where parallelism is visibly lacking, indicating a potential for improving evaluation time by better expressing parallelism in that area. Similarly, performance visualization 207 may show that a particular node in underlying parallel dependency graph 203 is directly contributing to a longer evaluation time, indicating a potential for improving evaluation time by modifying the identified node. Technical directors, character riggers, and the like may then modify parallel dependency graph 203 based on the information displayed in performance visualization 207 to optimize parallel dependency graph 203 and reduce the evaluation time in generating animated scene 205.

Figure 3:
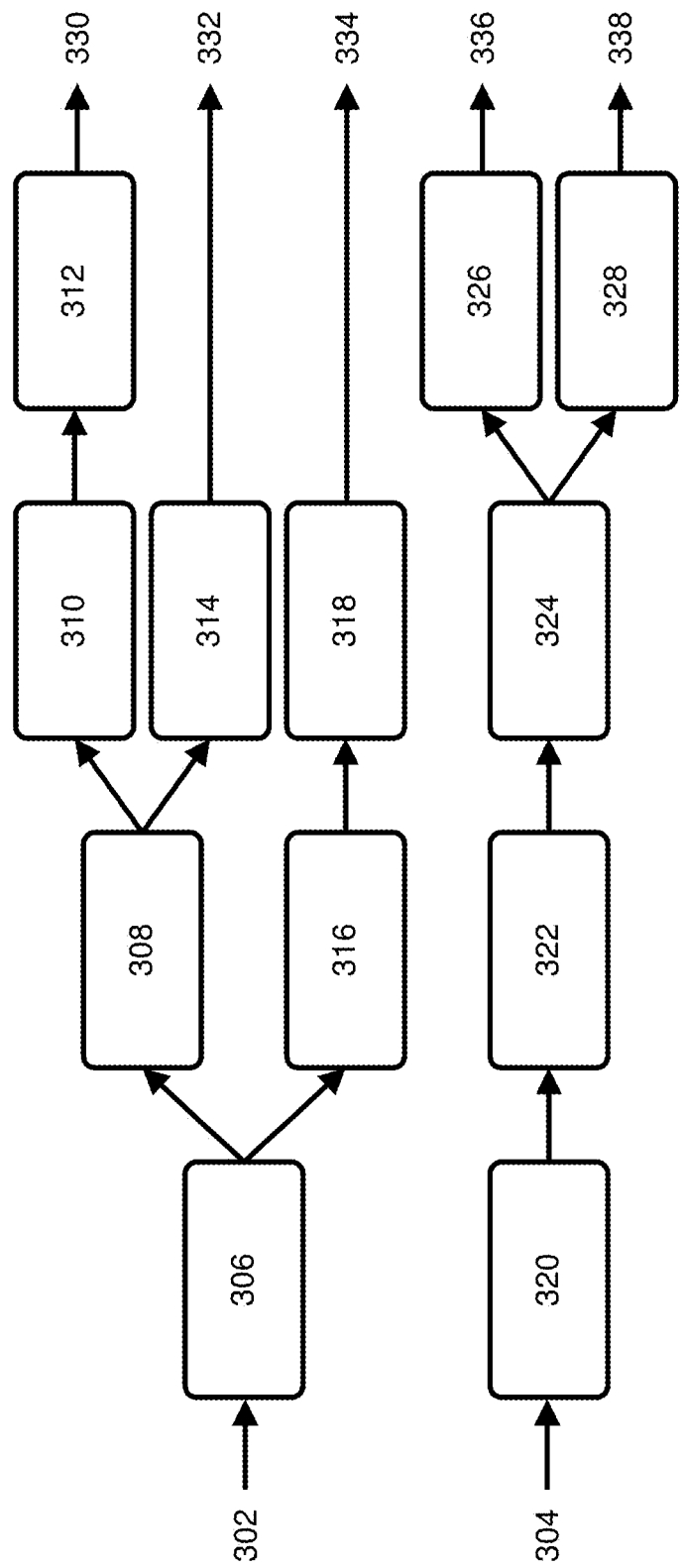
FIG. 3 illustrates an exemplary parallel dependency graph with interconnected nodes.
Figure 4:
FIG. 4 illustrates an exemplary computer-generated animation scene.

FIG. 3 illustrates exemplary parallel dependency graph 300 that may generate a computer-generated animation scene like that of FIG. 4. Parallel dependency graph 300 is made up of multiple nodes connected by flowing data. Inputs 302 and 304 may be, for example, data describing the movement of an animated character (e.g., the lion of FIG. 4), the background of a scene (e.g., curtains, carpet, etc. of FIG. 4), a change in time, or any of a variety of characteristics upon which nodes 306 and 320 are to perform computations to produce output attributes. For example, node 306 may be a motion node or deformer node that animates the movement of the lion's arm in FIG. 4. Input 302 may be a time, angle, direction, vector, curve, non-uniform rational basis spline, or any of a variety of other input attributes that node 306 may receive to process, for example, the movement of the lion's arm in FIG. 4 from one position to another.

As illustrated in FIG. 3, the output produced by node 306 is received as an input to both nodes 308 and 316, indicating that each requires the output of node 306 to perform its computation. For example, nodes 308 and 316 may correspond to the arm fur and paw of the lion in FIG. 4 and may use the output of node 306 to produce the detailed fur and paw position shown in FIG. 4. Similarly, the output of node 308 is received as an input to both nodes 310 and 314, while the output of node 316 is received as an input to node 318. Node 314 produces output 332, while the output of node 310 is received as an input to node 312, which produces output 330. Node 318, as illustrated, produces output 334. The various nodes and outputs along the chain beginning with node 306 may thus render the various attributes of the lion shown in FIG. 4.

Similarly, the output of node 320 is received as an input to node 322, the output of which is received as an input to node 324. Node 320 may correspond to the motion or deformation of the partially-visible seal shown in FIG. 4 (along with its decorative neck piece). The output of node 324 is then received as an input to both nodes 326 and 328, which produce outputs 336 and 338, respectively. The various nodes and outputs along the chain beginning with node 320 may thus render the various attributes of the partially-visible seal shown in FIG. 4. In other examples, outputs 330, 332, 334, 336, and 338 may be any of a variety of data used for rendering, animating, or otherwise modifying an animated character or scene. Although inputs and outputs are illustrated as single lines in graph 300, inputs and outputs may consist of multiple elements. Importantly, as illustrated, many nodes depend on the output of another upstream node in order to perform its computation. For example, node 322 may wait until node 320 produces its output before performing its computations and producing its output. In practice, when an attribute or input of a node is changed, its outputs may be marked "dirty," meaning that any cached values are stale and need to be recomputed. Destinations of the dirty values are likewise marked as dirty, such that a new input to the dependency graph causes a dirty state to propagate through all affected connections and nodes, requiring reprocessing of the affected dirty nodes in turn to obtain updated outputs.

Exemplary parallel dependency graph 300 illustrates the potential for concurrent processing as many nodes may be computed simultaneously. For example, node 306 and node 320 may each be computed concurrently, as they have separate inputs and are otherwise unconnected. In the example of FIG. 4, movements of the lion character corresponding to node 306 may be computed simultaneously with movements of the seal character corresponding to node 320. Similarly, nodes 312, 314, 318, 326, and 328 may all be computed simultaneously because they do not depend on the outputs of each other before performing computations. In contrast, however, graph 300 also illustrates how nodes may depend on other nodes, and chains of nodes may grow large and require significant computing time. For example, before node 312 may perform its computation, each of nodes 306, 308, and 310 must first complete their computations in turn. In the example of FIG. 4, the lion's fur likely may not be generated until the positions of the lion's limbs are determined by upstream nodes. These upstream nodes upon which node 312 is dependent may be referred to as its derivation or provenance. Downstream nodes may be referred to as a node's progeny (e.g., the downstream dependent progeny of node 308 includes nodes 310, 312, and 314). As parallel dependency graphs grow to hundreds or thousands of individual nodes (as is typical in computer animation), the complexity is compounded, and it becomes increasingly difficult to track and understand how the nodes are interconnected, and particularly difficult to identify sources of delay.

Figure 5:
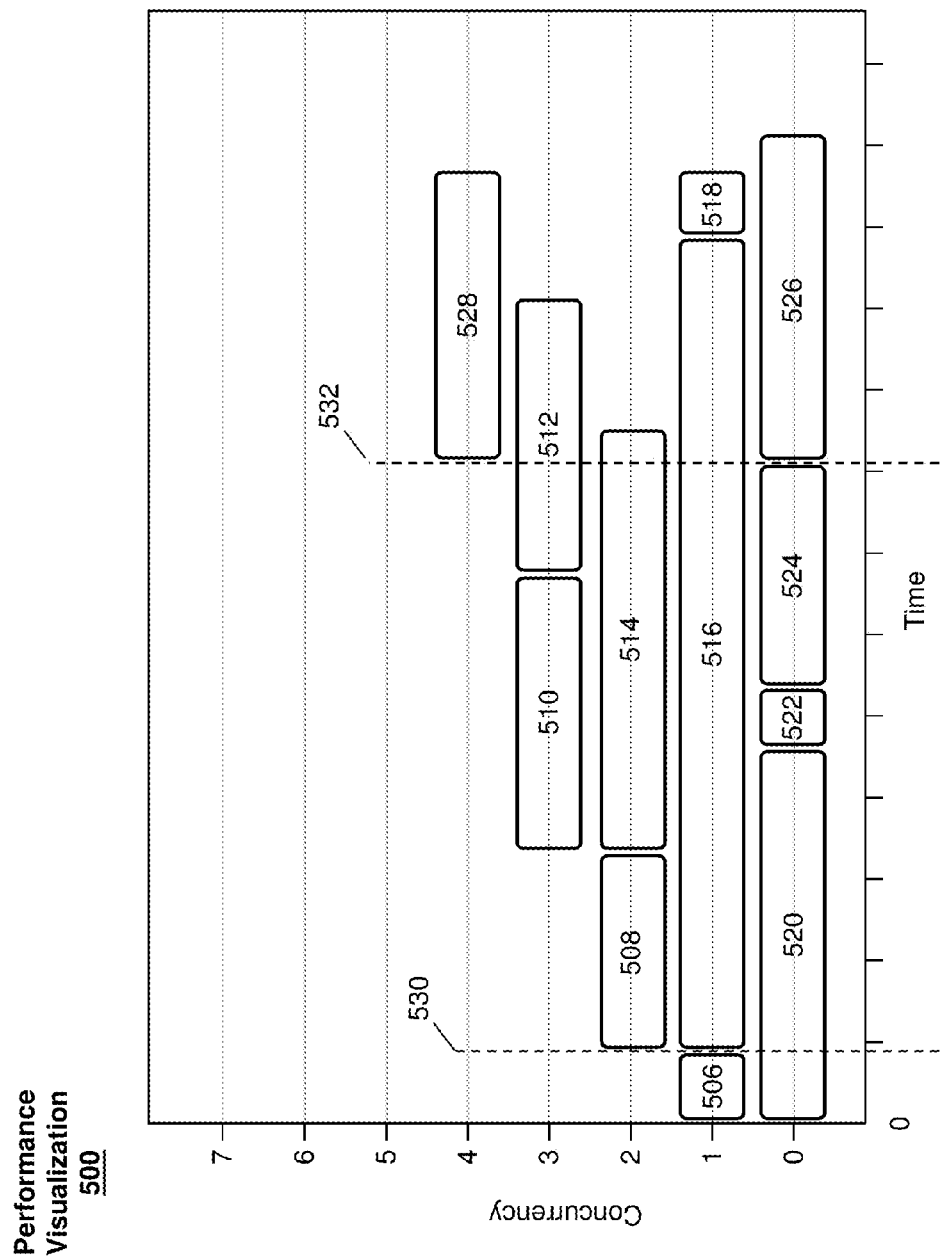
FIG. 5 illustrates an exemplary performance visualization of a parallel dependency graph evaluation.

FIG. 5 illustrates exemplary performance visualization 500 that may be generated from a runtime evaluation analysis of a multithreaded process, such as an evaluation of parallel dependency graph 300. In the illustrated example, performance visualization 500 may graphically illustrate the level of concurrency over time during evaluation of parallel dependency graph 300. Performance visualization 500 may be in the form of a graph, as illustrated in FIG. 5, but many other variants are contemplated for illustrating the level of concurrency during evaluation of a parallel dependency graph. In one embodiment, the vertical axis may be representative of the level of concurrency, and the horizontal axis may be representative of time, which may be absolute, relative, approximate, or another variant. Performance visualization 500 shows that at time zero (or the absolute time computation began for the parallel dependency graph) two nodes began simultaneously, as represented by node blocks 506 and 520. Although the axes may be customized for a particular organization or application, here, performance visualization 500 is configured to depict that if only one node is being computed, there is a concurrency level of zero, while each additional node running concurrently increments the concurrency level to one, two, and so on.

Performance visualization 500 represents node and node computation time with blocks that are sized and positioned to illustrate concurrency over time. Each node block may be positioned horizontally such that the leading edge of the node block corresponds to the time the node computation began, which in some embodiments may be the time when all required node inputs became available, the time when the corresponding process was scheduled by the operating system to run, or a similar time. The horizontal size of each node block may correspond to its runtime duration, such that the trailing edge of each node block corresponds to the stop time of the node computation, the time the node's computed outputs became available, the time processing passed to the next node, or a similar time. Although node blocks are illustrated as rectangular, stacked blocks, in other embodiments, they may be a different shape, and the layout of the visualization may be modified (e.g., the axes may be switched).

Dashed lines 530 and 532 are included as a reference demonstrating how dependencies may be readily identified from performance visualization 500. As shown, the leading edges of node blocks 508 and 516 immediately follow the trailing edge of node block 506. In one embodiment, this proximity may be understood as a potential dependency relationship. For example, node blocks 506, 508, and 516 could correspond to nodes 306, 308, and 316, respectively, illustrated in FIG. 3. As shown in FIG. 3, nodes 308 and 316 are dependent on node 306; thus dashed line 530 in FIG. 5 emphasizes how correlated stop and start times may indicate a dependent relationship between node blocks. Similarly, dashed line 532 illustrates a potential dependent relationship between node blocks 524, 526, and 528. In one example, these node blocks may correspond to nodes 324, 326, and 328, respectively, of FIG. 3, which affirms that nodes 326 and 328 are dependent on node 324 and thus require the output of node 324 before they can perform their own computation. Other dependencies are also illustrated, such as node block 510 to node block 512, node block 516 to node block 518, and node blocks 520, 522, and 524 in serial succession. In other instances, however, nodes may depend from more than one other node, and other methods may also be implemented to communicate the dependency relationship, such as highlighting or coloring node blocks to show relationships, listing the dependency relationships, graphing lines showing dependencies, or other techniques.

Character technical directors, riggers, and the like may thus readily identify from the layout of performance visualization 500 many potential dependency relationships among nodes along with node runtime duration, and may use these illustrated dependencies and runtimes in determining which target nodes or portions of the graph may be optimized to improve overall runtime performance. For example, programmers or other users may focus in on portions of performance visualization 500 and may visually identify time expensive node blocks and time expensive node bock chains and step up through the chain of node blocks—following the dependencies—to identify nodes that should be optimized or areas that may be reconfigured to improve processing time. Thus, one embodiment of a performance visualization with sizing and horizontally positioning node blocks based on start times and runtime duration (or stop time) may beneficially provide a quick visual cue of node runtimes and relevant node dependencies in the underlying parallel dependency graph.

Performance visualization 500, as mentioned above, also illustrates one embodiment of vertically positioning node blocks to graphically illustrate the level of concurrency, or how well parallelism is expressed in the underlying parallel dependency graph. In one embodiment, node blocks may be positioned horizontally, as described above, to correspond to the start and duration of processing time. To determine the vertical position in the graph, node blocks may be assigned to the lowest concurrency level available without overlap. For example, process 700 or process 720—described in greater detail below with reference to FIG. 7A and FIG. 7B—may be used to generate a performance visualization and lay out node blocks. In generating performance visualization 500, the visualization tool may have first placed node block 520 at concurrency level zero. When attempting to insert node block 506 into the graph, however, node block 520 would overlap node block 506, so the visualization tool may have incremented the concurrency level for node block 506 and positioned it as illustrated in performance visualization 500. In another embodiment, the visualization tool may identify overlapping times—or equivalently concurrently running nodes—from the runtime evaluation data it receives (e.g., a data file that includes runtime evaluation entries). For example, the visualization tool may compare start and stop times of the identified nodes in the runtime evaluation data file to determine where overlap occurs. When overlap is identified, the visualization tool may assign each node in the data file a particular concurrency level such that the corresponding node block may be positioned vertically without overlap.

FIG. 5 and performance visualization 500 also illustrate how concurrency may vary over time, and how the position of subsequent node blocks may accordingly change with time as well. For example, at runtime of the underlying parallel dependency graph from which performance visualization 500 may have been generated, computation may have begun simultaneously for both of the nodes corresponding to node blocks 506 and 520. After the node corresponding to node block 506 completed, however, two new nodes began computation as illustrated by node blocks 508 and 516, for a total of three concurrently executing nodes. Similarly, completion of the node computation corresponding to node block 508 yielded two new computing nodes corresponding to node blocks 510 and 514, for a total of four concurrently executing nodes. Thus, with the addition of new nodes independent of other executing nodes, the concurrency level and vertical position may be incremented to both avoid overlap and graphically illustrate concurrency in the underlying parallel dependency graph.

In one embodiment, node blocks may not be decremented in vertical position mid-stream, which may yield unfilled white space in the performance visualization, such as that following node block 514. As illustrated, the completion of the node corresponding to node block 524 (marked by dashed line 532) yielded two additional node blocks 526 and 528. At that time, the node corresponding to node block 514 was still computing, thus node block 528, to avoid overlap, was positioned at concurrency level four. After the node corresponding to node block 514 finished computing, however, an unfilled white space at concurrency level two resulted. In performance visualization 500, node block 528 was not lowered part-way through its runtime duration, but instead remained at concurrency level four. In other embodiments, however, some users may prefer that all white space be filled to maintain an instantaneously accurate concurrency level. In those embodiments, node block 528 may be split at the termination of node block 514, and the remainder of node block 528 may be positioned immediately following node block 514, thereby reflecting that the concurrency level at that time had decremented back to three (or four concurrently executing nodes). One of ordinary skill in the art will recognize that many variations are possible, and performance visualization tools and performance visualizations may be customized to fit the needs or preferences of particular organizations and particular users.

Users analyzing a parallel dependency graph may be particularly interested in the critical path through the parallel dependency graph. The critical path may be the path or chain of nodes that takes the longest to finish computing, or in other words, the longest path—measured by runtime duration—through the parallel dependency graph. As computing the critical path by definition may take longer than any other path in the parallel dependency graph, the critical path may also correspond to the overall computation or evaluation time of the entire parallel dependency graph. In animation, for example, the time to compute the critical path of nodes may signify the amount of time for the parallel dependency graph to finish animating, rendering, or otherwise processing an animation scene or character in a scene. The critical path of nodes may thus directly correspond to the responsiveness or efficiency of an animation program, such that longer critical paths, with longer computation times, may yield frustrating delays. Given the direct impact of the critical path on animation efficiency or animation program responsiveness, character technical directors, riggers, and other users may accordingly prefer to focus on the critical path for optimization (and arguably should focus efforts there given the impact). To aid users in this directed optimization, performance visualizations may be configured to emphasize the critical path (e.g., change a display property of the node blocks corresponding to nodes on the critical path).

Performance visualization 500 in FIG. 5 illustrates one method of emphasizing the critical path by positioning critical path node blocks at the lowest vertical position. As illustrated, the node corresponding to node block 526 was the last to finish computing. That indicates that node block 526 is on the critical path, as well as some or all of the derivation or provenance nodes that preceded node block

526. In this example, ascending the path leading to node block 526 shows that node blocks 524, 522, and 520 are also on the critical path (e.g., as shown in FIG. 3, node 326 depends from nodes 324, 322, and 320). In other words, the shortest amount of time for evaluating the parallel dependency graph underlying performance visualization 500 is dictated by the computation time of the nodes corresponding to node blocks 520, 522, 524, and 526 (e.g., computing nodes 320, 322, 324, and 326). In this example, the critical path of nodes is emphasized by placing these node blocks at concurrency level zero, making it easy to walk through the critical path node blocks to identify areas for optimization. In other examples, other display properties of node blocks may be changed; for example, node blocks corresponding to critical path nodes may be shaded or colored differently than other nodes, connecting lines may be drawn to identify the path, node blocks may include text detailing the critical path, or any of a variety of other illustration methods may be used to highlight the node blocks corresponding to critical path nodes.

A performance visualization tool may determine which nodes are on the critical path in a variety of ways, including starting at the last node to finish and ascending the derivation nodes through the start time, at each juncture selecting the next derivation node with a stop time corresponding to the start time of the current node in the path. In other examples, a performance visualization tool may walk each path through the parallel dependency graph, summing the runtime duration of each path to identify the longest path as the critical path of nodes. Walking paths through the parallel dependency graph may be done from the runtime evaluation data file, for example, by summing runtime duration for each distinct path of nodes, with each distinct path determined from start times, stop times, branches out to multiple nodes, and combinations into fewer nodes. For example, where the outputs of two nodes join to a common progeny node, the derivation node that finished computing last would be included in the running sum for a potential critical path including that node, as the path including that derivation node would be longer. In contrast, where a node's output branches to two progeny nodes, two separate paths must be tracked and summed, as either path could be the longest. Many other methods for determining the critical path of nodes are contemplated, any of which could be used to identify which node blocks to highlight in the performance visualization.

In the example shown in FIG. 5, a user reviewing performance visualization 500 may note that optimizing any of the nodes corresponding to node blocks 520, 522, 524, and 526 may improve overall runtime of the corresponding dependency graph. It should be noted, however, that typical analysis programs may suggest that optimizing the node corresponding to node block 516 would be preferable because the runtime duration of that node is significantly longer than any other node. However, optimizing the node corresponding to node block 516 may not reduce the overall runtime, as the critical path nodes may remain unchanged by those optimizations. Thus, performance visualizations as discussed herein may beneficially direct users to more meaningful optimizations that are more likely to improve overall runtime performance than optimizations suggested by typical analysis programs.

Figure 6:
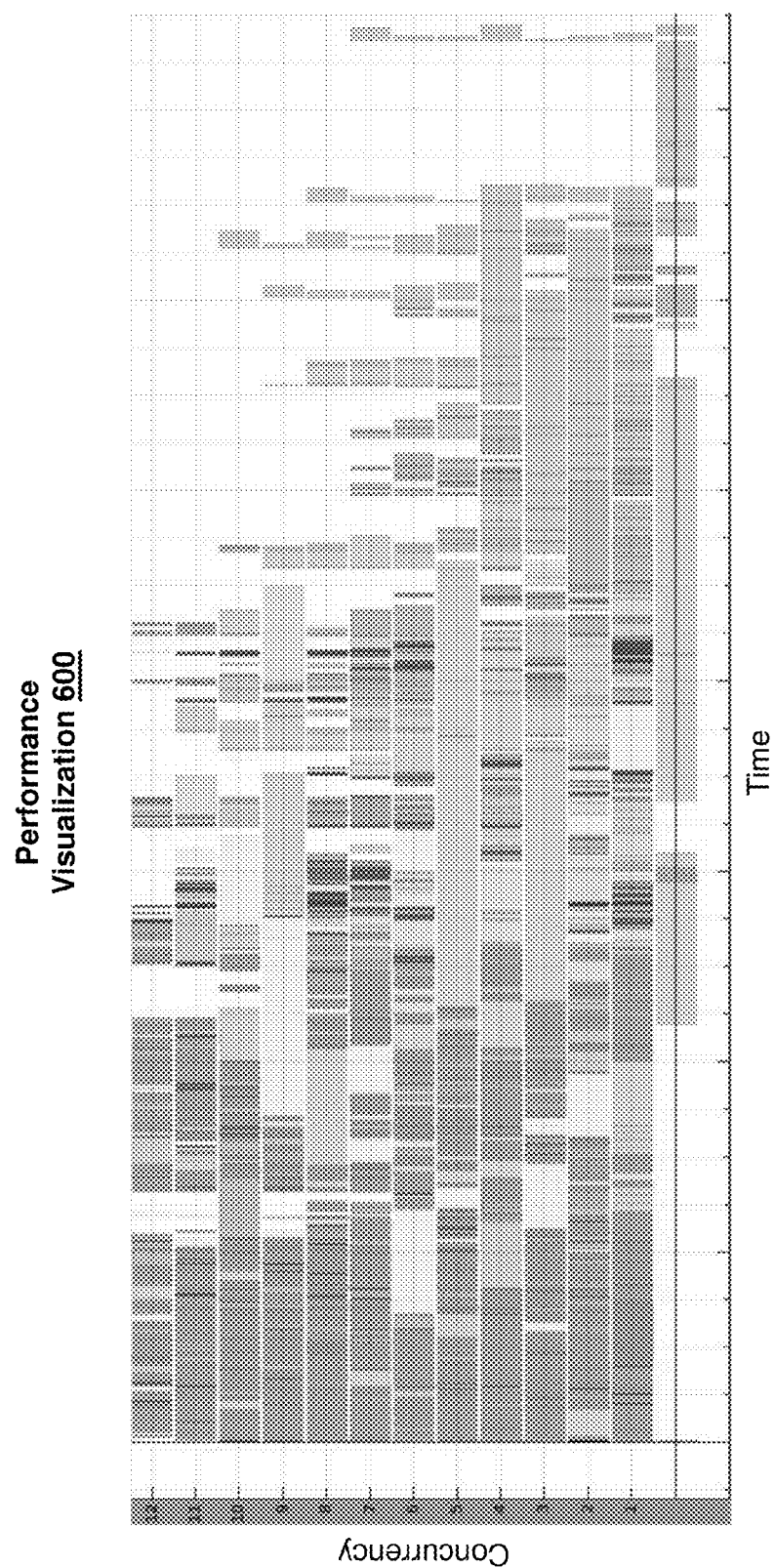
FIG. 6 illustrates an exemplary performance visualization generated from evaluating a parallel dependency graph animating a scene of a film.

FIG. 6 illustrates exemplary performance visualization 600 generated from evaluating a parallel dependency graph animating a scene of a film. Performance visualization 600 illustrates many variations possible in generating a performance visualization of a parallel dependency graph, depending on user needs and preferences. Performance visualization 600 includes thousands of distinct node blocks, many of which are fine vertical lines that may be distinguished by zooming in on those portions of the graph. Performance visualization 600 includes a maximum concurrency level of twelve, with an underlying parallel dependency graph that may have been running on a twelve-core processor. Of note, at some points in the graph, thirteen distinct node blocks are in process concurrently. Of course, at most twelve computations may be processed simultaneously on a twelve-core processor; however, more than twelve threads may be in process concurrently, and the operating system may schedule different threads on an alternating basis on any processor core. In other words, a node may be in process while occasionally being subject to pauses or delays while other processes occupy a processor core. These pauses or delays may be expected with numerous concurrent threads as an operating system itself may occupy processor cores to perform scheduling tasks and other operating system tasks. In many instances, programmers prefer to allow the operating system scheduler to determine the optimal distribution of threads across multiple processor cores, and occasional pauses and thread overlap are accepted consequences that are visible in performance visualization 600.

Performance visualization 600 also illustrates one embodiment of a performance visualization with varied shading and coloring that may indicate a number of different features. In one embodiment, node blocks corresponding to a type of computation may be similarly shaded or colored, such as shading all deformer-related node blocks the same. In another embodiment, node blocks may be shaded or colored to correspond to a particular element in a scene of animation. For example, in a scene with multiple characters, the node blocks corresponding to animating each of the characters may be shaded or colored to identify which node blocks correspond to which character. Background animation elements may also be shaded or colored differently from other elements. In the animated scene examples of FIG. 1 and FIG. 4, node blocks may be colored differently for each individual character: the lion, the giraffe, the zebra, and the seal. Similarly, node blocks corresponding to the background of these scenes may likewise be colored differently (e.g., curtains, carpet, walls, etc.).

In another embodiment, node blocks corresponding to different parts of a character may be shaded or colored differently, such as different colors for face animation node blocks, arm animation node blocks, core or stem animation node blocks, hair animation node blocks, leg animation node blocks, hand and finger animation node blocks, and the like. In the animated scene examples of FIG. 1 and FIG. 4, for example, the node blocks corresponding to the face of the lion may be shaded or colored differently than the node blocks corresponding to the arms of the lion. Similarly, the node blocks corresponding to the paw of the lion may be shaded or colored differently than the node blocks corresponding to the fur and mane of the lion. Both the elements to be distinguished and the shading or coloring methods implemented may be customized based on the needs and preferences of users. In some embodiments, the performance visualization may be modified in real time from a user selecting different preferences for display. For example, a user may initially display the performance visualization with colors distinguishing node computation type, change it later to distinguish based on character, and change it yet again to distinguish based on parts of characters, as desired. In the computer animation examples of FIG. 1 and FIG. 4, for example, a user may initially display different characters with different colors (e.g., lion, zebra, giraffe, seal, etc.) and later switch to displaying different core and body parts with different colors (e.g., stem, arms, legs, paws, head, etc.). In some embodiments, a graph key may be overlaid on the display, imbedded in the graph, provided as a pop-up option, or otherwise made available to associate particular colors or shades with particular elements (e.g., a table associating colors with character names, shading with node computation types, etc.).

Performance visualization 600 also illustrates how computer resource constraints or parallel dependency graph structures could lead to empty white space along concurrency level zero, or, in other embodiments, how only particular node blocks corresponding to certain nodes on the critical path may be highlighted or emphasized. As illustrated, there are several regions of empty white space along concurrency level zero. In one embodiment, such gaps may relate to machine resource restrictions. For example, in a computer with twelve processor cores, a thirteenth process may be forced to wait until twelve already-running processes complete and the thirteenth process is scheduled and begins to run on a processor. One node in a parallel dependency graph may have thirteen or more downstream dependencies. If twelve dependencies are already occupying the twelve processors, the remainder of the dependencies may be forced to wait. If one of the remaining dependencies is a critical node on the critical path, a gap may appear along concurrency level zero until the critical path node is processed. Thus, gaps may appear at concurrency level zero when critical path nodes are waiting for available resources. As illustrated in FIG. 6, gaps may appear frequently where many nodes are being processed and all processor cores are more likely to be occupied, thereby forcing critical path nodes to wait for machine resources to become available.

In other embodiments, only serial critical path node blocks may be positioned at the lowest level of the graph as opposed to all nodes on the critical path. In particular, the first node block that appears at concurrency level zero may have depended directly on different inputs from multiple nodes previously running in parallel; in other words, before the corresponding node could begin computation, several other independent, parallel nodes had to finish computing and provide their output attributes. Similarly, the nodes of some node blocks illustrated in performance visualization 600 at concurrency level zero may have branched out to multiple nodes, leading to a white space following the node block where parallelism is expressed; in other words, the corresponding node's output attributes were an input to multiple other nodes in parallel.

In some instances, users may be less interested in critical path regions that already express parallelism (which may include white spaces in performance visualization 600 along concurrency level zero), and instead prefer to focus on serial nodes on the critical path. Such serial nodes may exist where a node depends directly on only one prior node, or where a node's outputs feed directly into only one other node. Thus, as illustrated in performance visualization 600, the critical path node blocks emphasized and positioned at the lowest vertical level may include only those node blocks corresponding to serial nodes on the critical path, where parallelism is not expressed in computing the critical path attributes. The node blocks there illustrated may thus correspond to key nodes that each individually may have a direct impact on the overall runtime. As such, optimization efforts may be more likely to have a meaningful impact on overall runtime if directed to reducing the runtime of the serial nodes on the critical path or modifying the underlying parallel dependency graph to express parallelism along those serial sections in computing critical path output attributes.

In some embodiments, the critical path may be emphasized (i.e., display properties of the critical path node blocks may be changed) in performance visualizations by positioning the corresponding node blocks at the lowest level in the graph as described above. In other embodiments, the corresponding node blocks may instead be duplicated and depicted, for example, both at the lowest level in the graph and in line with nearby provenance or progeny node blocks at other concurrency levels. In still other embodiments, other display properties may be changed for critical path node blocks; for example, critical path node blocks may be highlighted or otherwise emphasized in the graph in a different color, different shape, with different text, or the like.

Although performance visualizations 500 and 600 are illustrated as static graphs, performance visualizations may be interactive displays, or may be accessed through a visualization tool providing for user interaction with the visualization. Many interactions may be exercised with a mouse, keyboard, touchscreen, gestures, or the like. In one embodiment, users may zoom in on any portion of the graph, better enabling them to see distinct node blocks in high detail, or zoom out, giving a larger perspective overview. Users may also drag the graph view around the display screen to focus on specific portions of visualizations, scroll the graph view or window in any direction, or stretch the graph view horizontally or vertically as desired. In some embodiments, the mouse pointer or other position indicator mechanism may be illustrated as a set of crosshairs—intersecting lines that extend to the axes or across the entire display to allow users to compare start and stop times, concurrency levels, and the like. The position of the cross point of the crosshairs (time and/or concurrency level) may be reported textually on the screen in a text box, a header, a footer, a graph key, or other display.

In some embodiments, a user may request information about a particular node block by simply directing a mouse pointer or other position indicator to the node block (e.g., mouse over a node block, position crosshairs on a node block, etc.). A visualization tool may then provide a variety of information about the particular node block, such as node name or identification, start time, stop time, runtime duration, derivation nodes, progeny nodes, node type, animation character name, animation character part, and the like. Information may be displayed in a pop-up text box or in a fixed text box overlaid on a portion of the display. In other examples, information may appear in the header or footer of the display window or the graph. In still other examples, users may request information by a particular keystroke or buttons on the screen.

Features for changing the display properties (e.g., highlighting or emphasizing) derivation and progeny nodes may also be incorporated into performance visualizations. For example, identifying or selecting a particular node block may cause some or all of the corresponding derivation node blocks and progeny node blocks to be highlighted, shaded or colored differently, otherwise set apart from other node blocks, depicted alone in the visualization, or the like. Keystrokes or other commands may also be provided to request that a visualization tool modify the graph to change the display properties of a particular set of node blocks (such as related upstream derivation or downstream progeny node blocks).

Figure 7:
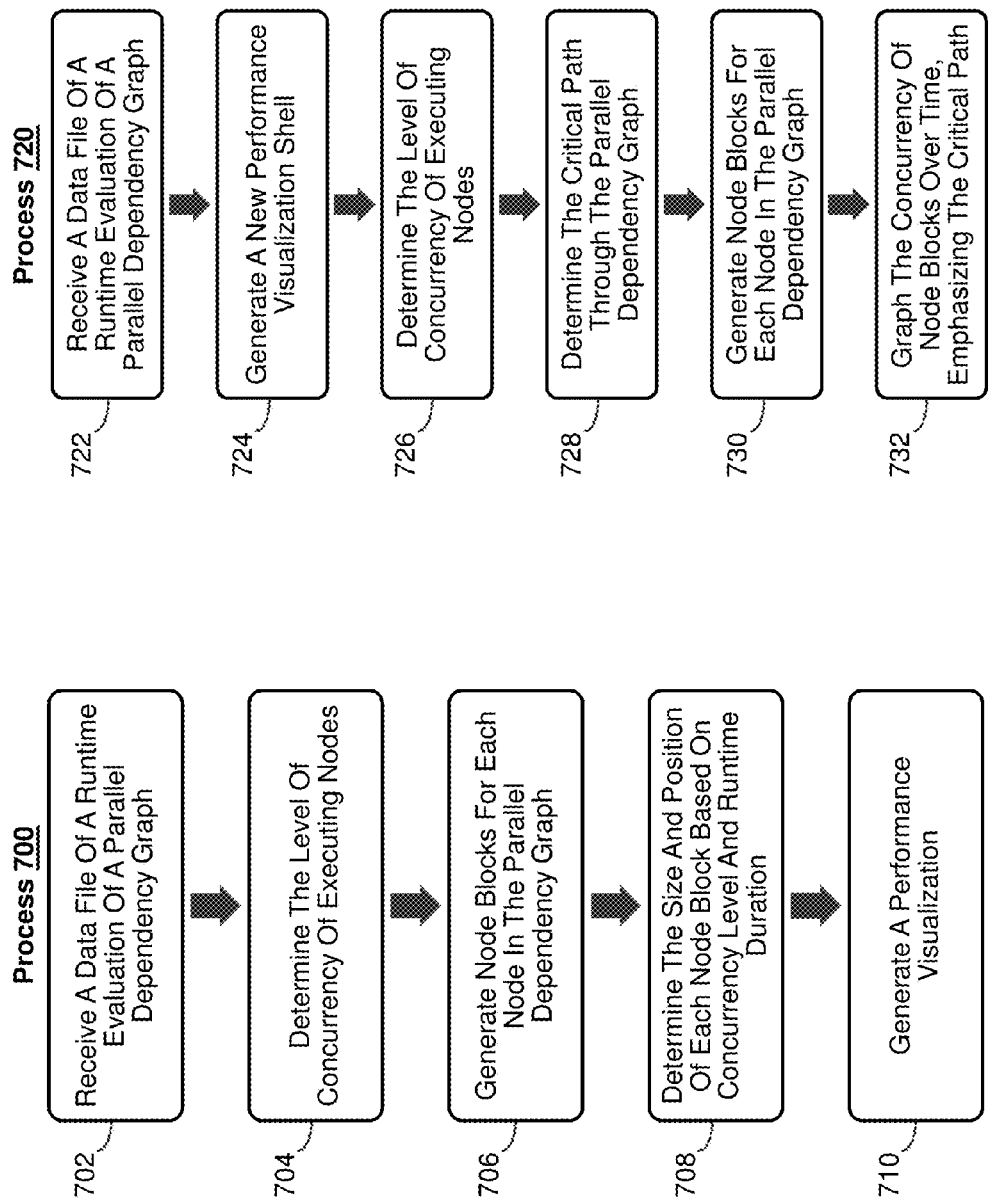
FIG. 7A illustrates an exemplary process for generating a performance visualization of a parallel dependency graph evaluation.
FIG. 7B illustrates an exemplary process for generating a performance visualization that emphasizes the critical path of nodes in a parallel dependency graph.

FIG. 7A illustrates exemplary process 700 for generating a performance visualization of a parallel dependency graph evaluation. Process 700 may be executed on a workstation computer, a laptop computer, a tablet computer, a mobile handheld computer, a server, across multiple workstations, across multiple servers, over the internet, or on a variety of other computational devices. Although process 700 may be performed by a variety of devices and/or programs, for illustrative purposes, process 700 will be described as being performed by a visualization tool that may be a computer programmed to perform the particular functions.

At block 702, a visualization tool may receive a data file of a runtime evaluation of a parallel dependency graph. In one embodiment, the data file may have been generated by a monitoring tool that records the computer clock start time and stop time of each node during evaluation of a parallel dependency graph. For example, the data file may include a table of runtime evaluation entries listing each node in the parallel dependency graph, the time each node started computing, and the time each node stopped computing. Each node may be identified in any of a variety of ways, such as a unique identification number, a node name, a node computation type, an affected animation element, or the like. Start times may be the computer clock time when a node was scheduled to run, when node inputs became available, when a node began computing, or the like. Stop times may be the computer clock time when a node was terminated, when node outputs became available, when a node stopped computing, or the like.

The runtime evaluation data file may also include processor core identification for each node (i.e., for each runtime evaluation entry). For example, for a twelve-core processor, the data file may indicate which processor or processors (one through twelve) performed the computations of each node. In some cases, nodes may themselves be multithreaded processes that include parallelism, so multiple processors may be used to perform node computations in parallel, and any or all of those processors may be identified in the data file. In other cases, an operating system may migrate node computation from one processor to another processor, and both processors may be identified in the data file (as well as any additional processors that perform node computations, if any).

The information included in the data file may also be customized based on the needs and preferences of particular organizations and users. For example, in some examples the data file may include a listing of the upstream derivation and downstream progeny of each node (i.e., for each runtime evaluation entry), a tag identifying the type of computation, a pointer or link to other files with parallel dependency graph information, a time stamp of when the evaluation was done, network status during evaluation, memory access delay information, the user or users running the evaluation, or any of a variety of other identifying information that may be useful to a character technical director, rigger, or the like for analyzing and/or improving performance.

At block 704, the visualization tool may determine the level of concurrency of executing nodes. In one embodiment, the visualization tool may scan through the runtime evaluation data file (through each runtime evaluation entry), incrementing a concurrency count at the start time of each node, and decrementing the concurrency count at the stop time of each node. The tool may track how the concurrency level changes, and it may assign a concurrency level to each node in the data file as it traverses across time. In one embodiment, the tool may work backwards from the last node to finish computing up through the first node to begin, incrementing a concurrency level with each stop time, and decrementing the level with each start time. In still other embodiments, the tool may traverse the data file and assign concurrency levels to avoid overlap in the ultimate performance visualization, as mentioned above. Determining the level of concurrency of executing nodes may also be done in other ways depending on user preference or a particular implementation.

At block 706, the performance visualization tool may generate node blocks for each node in the parallel dependency graph. In one embodiment, the tool may populate a graph with each node block and its associated information, such as horizontal position, vertical position, size, color, shape, text, identifying information, and the like. In some embodiments, generating node blocks may include causing the node blocks to be stored in a memory representation of the graph, or causing the node blocks to be drawn or displayed on a graph. In other embodiments, generating node blocks may include creating new node block objects, each with characteristics describing how it should be sized and positioned, along with other identifying information, such as node name or identification and the like. In still other embodiments, generating node blocks may include adding new characteristics to a visualization graph object describing how the graph should be rendered, or otherwise organizing node block data in preparation for displaying a graph visualization. Other embodiments may include other steps for organizing node block information and preparing it for display.

At block 708, the performance visualization tool may determine the size and position of each node block based on the concurrency level determined at block 704 and the runtime duration of each corresponding node. As illustrated in FIG. 6, each node block may have a width corresponding to the runtime duration of the corresponding node. Likewise, the position of each node block may be based at least in part on the concurrency level of each node determined at block 704. The leading edge of each node block may correspond to its start time, and the trailing edge to its stop time. The vertical position may be based on the concurrency level to ensure that node blocks do not overlap, which also may illustrate how well parallelism is expressed in the underlying parallel dependency graph.

At block 710, the performance visualization tool may generate a performance visualization (such as those shown in FIG. 5 and FIG. 6) including each of the node blocks with the size and at the position determined at block 708. In one embodiment, generating a performance visualization may include generating a displayable graph in memory that includes each of the node blocks in position. In other embodiments, generating a performance visualization may include causing the performance visualization to be displayed on a display device, including one or more of the node blocks as needed to populate a particular view of the graph. In still other embodiments, generating a performance visualization may include storing data in memory, in conjunction with other graph information, in preparation for displaying the visualization.

FIG. 7B illustrates exemplary process 720 for generating a performance visualization that emphasizes the critical path of nodes in a parallel dependency graph. Process 720 may include some of the same steps as process 700, and the two processes may likewise be combined or altered according to user needs.

At block 722, a visualization tool may receive a data file of a runtime evaluation of a parallel dependency graph just as at block 702 of process 700. At block 724, the visualization tool may generate a new performance visualization shell (e.g., an object, a graph, a file, a placeholder, etc.). In some embodiments, generating a new performance visualization shell may include creating a new performance visualization file for storing (temporarily or permanently) the performance visualization data. In other embodiments, generating a new performance visualization shell may include causing a blank graph to be generated in memory, or in some cases, displayed in anticipation of populating the graph with node blocks. In still other embodiments, generating a new performance visualization shell may include causing a performance visualization object to be generated in memory with certain features, where new node blocks and other graph features may be added to the object as the information is processed or requested. In some embodiments, this step may be omitted entirely or postponed until the visualization is to be displayed on a display device. Generating a new performance visualization shell may also be customized in a variety of other ways based on a particular implementation on a particular system for a particular organization and its needs.

At block 726, the visualization tool may determine the level of concurrency of executing nodes just as at block 704 of process 700. At block 728, the visualization tool may determine the critical path through the parallel dependency graph. In one embodiment, the tool may determine the critical path at the same time it traverses the data file to determine concurrency levels. For example, starting with the last node to finish computing, the tool may traverse the data file backwards in time, identifying the concurrency levels along the way, as well as tracking the derivation or provenance of the last node to finish computing (some of the derivation nodes also being part of the critical path, as discussed above). In other embodiments, the tool may walk each path through the parallel dependency graph to determine the path with the longest runtime duration, in some cases by traversing each path in the data file marked by corresponding start times and stop times. In still other embodiments, the tool may analyze runtime durations and dependencies using other methods to determine which nodes are on the critical path. In some examples, the critical path may include only serial critical path nodes where parallelism is not expressed in the dependency graph along the critical path. In other examples, the longest nodes in sections with parallelism may be identified as critical path nodes, or all nodes touching the critical path may be identified as critical path nodes.

At block 730, the performance visualization tool may generate node blocks for each node in the parallel dependency graph just as at block 706 of process 700. In generating node blocks at block 730, the tool may modify a graph, graph object, software object, shell, or the like that may have been generated at block 724. At block 732, the performance visualization tool may graph the concurrency of node blocks over time, emphasizing the critical path. In one embodiment, graphing the concurrency of node blocks over time may include generating a displayable graph in memory that includes each of the node blocks in position. In other embodiments, graphing the concurrency of node blocks over time may include causing the performance visualization to be displayed on a display device, including one or more of the node blocks as needed to populate a particular view of the graph. In still other embodiments, graphing the concurrency of node blocks over time may include storing data in memory, in conjunction with other graph information, in preparation for displaying the visualization. Emphasizing the critical path may include any of the methods described above, such as emphasizing critical path node blocks with highlighting, shading, coloring, positioning, or the like.

Depending on the particular implementation, some steps of processes 700 or 720 may be omitted, modified, or combined together, and the order may be altered. In addition, in some embodiments, process 700 or process 720 may be followed by causing a visualization to be displayed on a display device, which may allow for user interaction that may require redrawing parts of the visualization, which in turn may require repeating some steps in process 700 or process 720 based on user requests to modify what is being displayed.

Many other variants may also be implemented in a visualization tool and in generating performance visualizations. In one embodiment, for example, node blocks may be marked differently to indicate whether or not the corresponding node is multithreaded. For example, node blocks of multithreaded nodes may be marked with a line, symbol, color, shade, text, or the like to distinguish them from node blocks of single threaded nodes. Whether a node is multithreaded may be hard-coded as part of the runtime evaluation data file or parallel dependency graph, or it may be inferred from runtime evaluation data. In some embodiments, the level of multithreading in a node may be graphically represented by levels of shading, colors, text, or the like to illustrate how well a node is internally threaded compared to other multithreaded nodes.

In some embodiments, different graphs or visualizations may also be generated, such as a graph of node blocks organized by processor core identification (such as one through twelve) over time. For example, the vertical axis, instead of concurrency level, may be organized by processor core identification, and node blocks may be vertically positioned based on the core identification (or core id) corresponding to the processor core on which the node was computed. In some cases, multithreaded nodes may be distributed across multiple processor cores, so the graph may also illustrate how some nodes themselves exhibit parallelism by stretching a block vertically across multiple processor levels, or duplicating a similar node block on multiple processor core levels. In other instances, a single node thread may be moved from one core to another, so the graph may illustrate thread migrations that in many cases may add delay as cache values need to be copied, for example. In some embodiments, a visualization tool may include buttons, menu items, key strokes, or similar commands for causing a processor core id-type graph to be displayed. In contrast to graphs illustrating concurrency levels, a processor core id-type graph may be limited vertically to the number of processor cores, so the graph may also illustrate gaps as some nodes are paused and later resumed after another process is inserted and occupies processing time (e.g., other node processes, operating system tasks, etc.).

In another embodiment, any of the performance visualizations or graphs discussed herein may be modified by filtering the display to show only certain node blocks. For example, a performance visualization tool may include a button, check box, menu, toggle, keystroke command, or other command method for selecting which node blocks to display. Users may, for example, filter the display to show only those node blocks corresponding to a particular function, node type, character, color, processor core, character element, motion, scene, or the like. In the example computer animations of FIG. 1 and FIG. 4, for example, users may display only those node blocks corresponding to the lion. Users may also filter the display to show only those blocks on the critical path, or node blocks that are related to critical path nodes (such as derivation nodes or progeny nodes, whether or not they are on the critical path). Similarly, users may filter the display to show only those node blocks relating to a selected node, such as all derivation node blocks and progeny node blocks of a selected node. As mentioned above, the display may also be modified to change the display properties (e.g., highlight or emphasize) any of these node blocks in any of the ways discussed herein.

Performance visualizations or graphs may also be configured to display the dirty state of the corresponding nodes. In some embodiments, nodes in a parallel dependency graph that are dirty may be marked with a particular level of dirtiness as well, such as heavy dirty, partial dirty, light dirty, or the like. The level of dirtiness may correspond to how significant the reevaluation of a node may be, depending, for example, on how significantly its input attributes have changed. For example, if all input attributes are changed, and a full reevaluation of a node is required, that node may be considered heavy dirty. In contrast, if only one of many input attributes has changed, and reevaluation is relatively minor, that node may be considered partial dirty or light dirty. Performance visualizations or graphs may be configured to illustrate the level of dirtiness of nodes before they were recomputed by marking or flagging node blocks in a particular way. For instance, dirty levels may be indicated on node blocks using shading, colors, symbols, lines, text, or the like. A visualization tool may also be configured with a check box, button, menu option, toggle option, keystroke command, or the like for selecting whether or not to display the dirty state in a graph or performance visualization.

A visualization tool may also incorporate additional tools for aiding character technical directors, riggers, and other users to analyze parallel dependency graph performance and even simulate how changes may affect performance. In one embodiment, users may be able to drag and drop node blocks in performance visualizations to see how rearranging the underlying parallel dependency graph might affect evaluation performance. For example, users may identify a lengthy section of serial node blocks and drag and drop other node blocks in parallel with the serial node blocks (i.e., relocating later node blocks in the visualization to appear in parallel with the serial section). Similarly, users may insert new node blocks into the visualization taken from other visualizations or by creating customized blocks to simulate how the performance visualization might look if the underlying parallel dependency graph were modified to achieve the simulated visualization with the new nodes inserted. Although dragging and dropping a node block is theoretical and may not always be plausible given node dependencies, the ability to simulate the changes may be very useful, and users may be able to more easily visualize how significant an impact such changes may have if the parallel dependency graph may be reconfigured in a particular way. Additionally, inserting new node blocks into an existing visualization illustrates how available processing time may be utilized to process nodes that may not yet be a part of a particular parallel dependency graph. Thus, enabling users to modify performance visualizations and simulate potential changes may provide an additional aid to users for analyzing parallel dependency graphs and determining where to direct optimization efforts.

A visualization tool may also be configured to report statistics or diagnostic data. In one embodiment, a visualization tool may provide an average graph concurrency, which may be computed as the average number of nodes running in parallel. By reporting a standard number such as average concurrency, different parallel dependency graphs may be compared against each other, and different character technical directors, riggers, or other users may be compared against each other or even compete against each other for the highest average concurrency as measured by this statistic. The statistic may be displayed by user request or in response to any of the command methods discussed herein. In some embodiments, average graph concurrency may be computed for an entire parallel dependency graph regardless of what is displayed, but in other embodiments, average graph concurrency may be computed for the portion of a performance visualization that is displayed in a visualization tool window, allowing for finer detail of segments of a parallel dependency graph.

Other analysis tools may also be incorporated into a visualization tool, including enabling a user to load more than one runtime evaluation data file at time, and display multiple performance visualizations or graphs at a time. In one embodiment, when a user modifies a parallel dependency graph, they may load a data file collected before the modification along with a data file collected after the modification to compare the two visualizations and see how the modifications affected performance. Similarly, a graph may be generated illustrating the ratio of change from one evaluation to another (e.g., one to one, four to one, etc.). Multiple graphs or visualizations may be arranged in a variety of ways to facilitate comparison, such as side by side or vertically aligned. In some embodiments, unrelated data sets may be loaded simultaneously, and users may be able to view and interact with multiple visualizations and graphs simultaneously. For example, a project manager may load multiple data files generated from each of the parallel dependency graphs related to the project to allow quick comparisons of the various graphs and the statistics of each graph. Users may also be able to coordinate interactions with multiple displayed graphs or visualizations, such as duplicating crosshairs on each graph at the same position, coordinating graph modifications such as zooming such that it occurs on multiple graphs simultaneously, or the like. In other embodiments, multiple instances of a visualization tool may be able to run on the same machine, independent of one another.

Other visualization or graph views may also be incorporated into a visualization tool to provide additional analysis aids. In one embodiment, a category view may be provided. A category view may illustrate graphically the summed category runtime for all nodes related to each category like face, wardrobe, hair, and the like. Node blocks or other figures may be graphed to compare the amount of time spent on each category, such as a bar graph with each category listed on one axis and summed time on the other axis. Similar category views may also be provided for other category types such as frames, node functions, characters, scene elements, or the like, to allow a visual comparison of the different total runtimes of the different elements in each category. In one embodiment, selecting a particular bar or otherwise identifying a particular element in the graph (by double-clicking, for example) may cause a performance visualization to be displayed that includes node blocks corresponding to the particular element selected.

In another embodiment, a concurrency histogram view may be provided. The histogram may graphically illustrate how much time a certain number of cores are being used or how much time a certain number of nodes are concurrently executing. For example, a visualization tool may sum the time one node is executing, the time two nodes are concurrently executing, the time three nodes are concurrently executing, and so on. The summed time may then be displayed in a histogram format with bars sized to illustrate the length of time a particular number of nodes or cores were processing. In this way, where parallelism is better expressed, histogram bars corresponding to larger numbers of concurrently executing nodes should be much larger than histogram bars corresponding to smaller numbers of concurrently executing nodes. Such a concurrency histogram view may thus provide another reference for analyzing how well parallelism is expressed in a parallel dependency graph.

A visualization tool may also provide methods of identifying the most expensive nodes in a parallel dependency graph. In one embodiment, a visualization tool may provide a list of all nodes and their corresponding runtimes, and the list may be sorted by runtime such that the nodes with the longest runtimes are listed first (or last, as desired). In another embodiment, a visualization tool may provide a graph view of all nodes and their corresponding runtimes. Such a graph may have an axis corresponding to runtime, with another axis listing each node, optionally sorted by runtime such that the nodes with the longest runtimes appear at the opposite extreme from the nodes with the shortest runtimes. Such a graph may include lines, dots, symbols, or the like sized and/or positioned to illustrate runtimes. In one embodiment, a user may mouse over or otherwise select a particular node in the runtime comparison list or graph, which may cause display properties to be changed for the corresponding node block in a performance visualization (e.g., highlighted or otherwise emphasized) to enable the user to quickly see where the node block appears.

It should be noted that the various embodiments described herein with reference to parallel dependency graphs in animation may also be used in the context of any other multithreaded computer programs and processes. An exemplary visualization tool in such a context may include a computer program that generates performance visualizations, statistics, and the like from runtime analysis data of a multithreaded computer program or process. The data may include identifying information for the various threads, processes, or sub-processes in the computer program, along with the runtime execution start time and stop time of each thread, process, or sub-process. The exemplary visualization tool may analyze the data and generate a performance visualization that graphically illustrates the level of concurrency during program execution (e.g., how well parallelism is expressed in a program or how well a program utilizes multiple processing cores). The tool may also generate statistics and a variety of different graphical illustrations for analyzing multithreaded programs just as for parallel dependency graphs as discussed herein.

A software programmer, program designer, technical director, or the like may then use the performance visualization, statistics, and other illustrations to visualize data flow and analyze the performance of a program, in particular how well the program is structured for parallel execution. Optimizations can then be directed to those threads, processes, or sub-processes that directly impact overall runtime as illustrated in the performance visualization. Additionally, the ordering or structure of a program or process may be modified to express more parallelism and reduce overall runtime by focusing on areas in the performance visualization with extra parallel capacity. Similarly, new processes or additional threads may be inserted into areas of a multithreaded program where the performance visualization illustrates free parallel capacity during evaluation. Thus, the various embodiments and examples discussed herein for parallel dependency graphs may be readily extended to any other multithreaded computer program or process.

Figure 8:
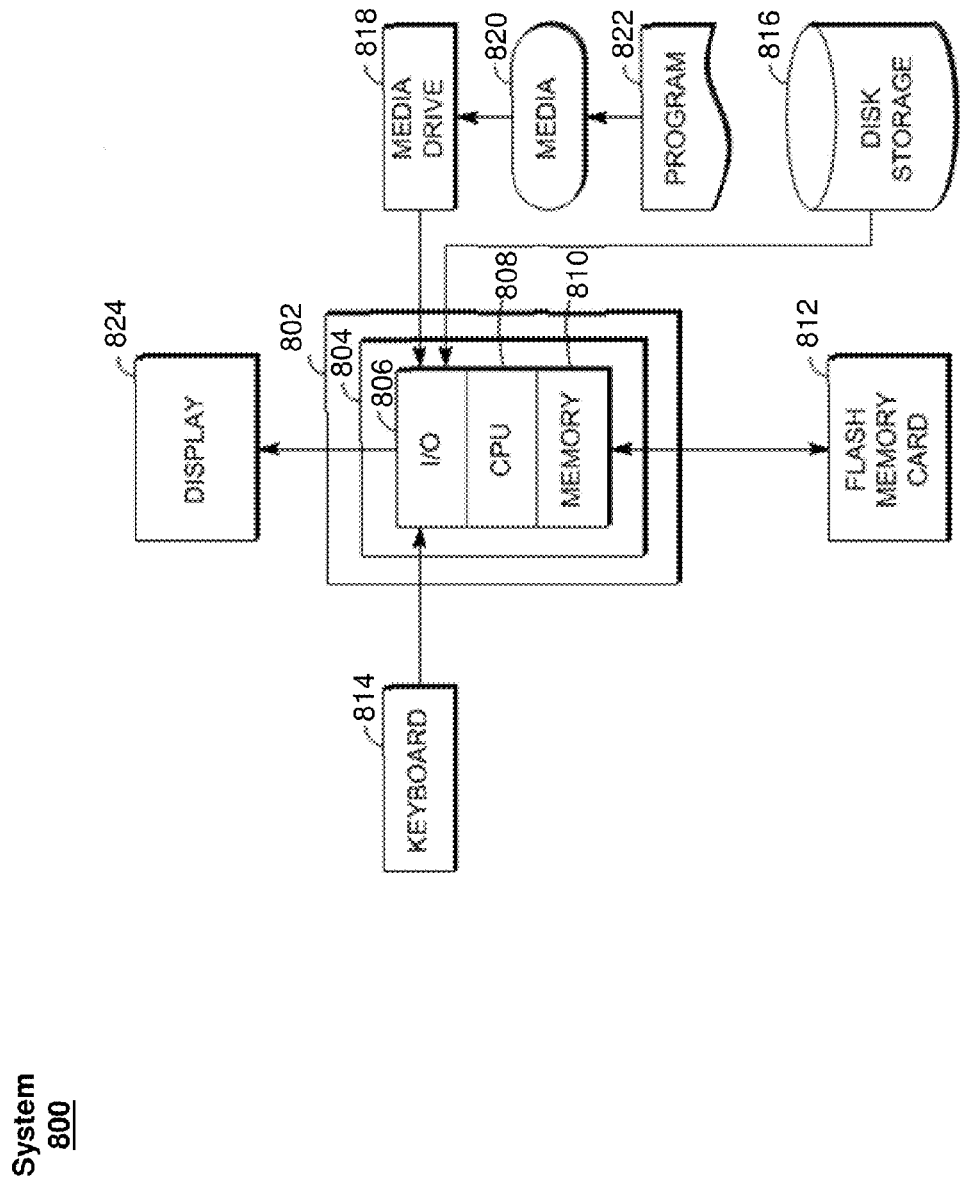
FIG. 8 illustrates an exemplary computing system.

FIG. 8 illustrates an exemplary computing system 800 configured to perform any one of the above-described processes. In this context, computing system 800 may include, for example, a processor (which may have multiple cores), memory, storage, and input/output devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts an exemplary computing system 800 with a number of components that may be used to perform the above-described processes. The main system 802 includes a motherboard 804 having an input/output ("I/O") section 806, one or more central processing units ("CPU") 808 (which may have multiple cores), and a memory section 810, which may have a flash memory card 812 related to it. The I/O section 806 is connected to a display 824, a keyboard 814, a disk storage unit 816, and a media drive unit 818. The media drive unit 818 can read/write a non-transitory computer-readable storage medium 820, which can contain programs 822 or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A computer-implemented method for generating a performance visualization of a parallel dependency graph in computer animation, the method comprising:
   receiving a data file comprising a plurality of runtime evaluation entries for a plurality of nodes of a parallel dependency graph, wherein runtime evaluation entries comprise a node identification and a runtime duration;
   determining a concurrency level for each node of the plurality of nodes of the parallel dependency graph based on a number of concurrently executing nodes in the data file;
   generating a node block for each node of the plurality of nodes;
   determining a size for each node block based on the runtime duration of a respective node;
   determining a position along at least one axis for each node block based on the concurrency level of a respective node, wherein positions along the at least one axis of node blocks represents the concurrency level of respective nodes; and generating a performance visualization with one or more entire node blocks with the respective determined size and at the respective determined position along the at least one axis.

2. The computer-implemented method of claim 1, wherein the runtime duration comprises a start time and a stop time.

3. The computer-implemented method of claim 2, wherein determining the size and the position of the node blocks comprises:
determining the size of the node block based on the difference between the corresponding start time and stop time; and
determining the position of the node block based on the corresponding start time and the concurrency level determined for the corresponding node at that time.

4. The computer-implemented method of claim 2, wherein a leading edge of the node block corresponds to the start time of the corresponding node in the data file, and a trailing edge of the node block corresponds to the stop time of the corresponding node in the data file.

5. The computer-implemented method of claim 2, wherein determining the position of the node blocks comprises:
determining the vertical position of the node block based on the concurrency level determined for the corresponding node.

6. The computer-implemented method of claim 2, further comprising:
receiving a request for characteristics of a particular node block in the performance visualization; and
in response to receiving the request for characteristics of the particular node block, providing the corresponding node identification, start time, and stop time of the particular node block.

7. The computer-implemented method of claim 6, wherein runtime evaluation entries in the data file further comprise a processor core identification, and wherein the method further comprises:
in response to receiving the request for characteristics of the particular node block, providing the corresponding processor core identification of the particular node block.

8. The computer-implemented method of claim 6, further comprising:
identifying an upstream derivation and a downstream progeny for a node associated with the corresponding node block; and
in response to receiving the request for characteristics of the particular node block, providing the corresponding upstream derivation and downstream progeny of the particular node block.

9. The computer-implemented method of claim 8, further comprising:
causing the performance visualization of the parallel dependency graph to be displayed; and
in response to receiving the request for characteristics of the particular node block, changing a display property of the corresponding upstream derivation and downstream progeny of the particular node block.

10. The computer-implemented method of claim 1, further comprising:
assigning node blocks a concurrency level that is different from the concurrency level of any other node block overlapping in time; and
determining the position of the node blocks based on the assigned concurrency level.

11. The computer-implemented method of claim 1, further comprising:
causing the performance visualization of the parallel dependency graph to be displayed.

12. The computer-implemented method of claim 1, further comprising:
determining a critical path of nodes through the parallel dependency graph; and
determining the position of one or more node blocks in the performance visualization based on the critical path of nodes through the parallel dependency graph.

13. The computer-implemented method of claim 12, wherein determining a critical path of nodes through the parallel dependency graph comprises:
determining, from the data file, a chain of nodes with the longest runtime duration.

14. The computer-implemented method of claim 13, further comprising:
changing a display property of one or more node blocks corresponding to nodes on the critical path.

15. A non-transitory computer-readable storage medium comprising computer-executable instructions for generating a performance visualization of a parallel dependency graph in computer animation, the computer-executable instructions comprising instructions for:
receiving a data file comprising a plurality of runtime evaluation entries for a plurality of nodes of a parallel dependency graph, wherein runtime evaluation entries comprise a node identification and a runtime duration;
determining a concurrency level for each node of the plurality of nodes of the parallel dependency graph based on a number of concurrently executing nodes in the data file;
generating a node block for each node of the plurality of nodes;
determining a size for each node block based on the runtime duration of a respective node;
determining a position along at least one axis for each node block based on the concurrency level of a respective node, wherein positions along the at least one axis of node blocks represents the concurrency level of respective nodes; and
generating a performance visualization with one or more entire node blocks with the respective determined size and at the respective determined position along the at least one axis.

16. The computer-readable storage medium of claim 15, wherein determining the position of the node blocks comprises:
determining the vertical position of the node block based on the concurrency level determined for the corresponding node.

17. The computer-readable storage medium of claim 15, further comprising:
determining a critical path of nodes through the parallel dependency graph by determining, from the data file, a chain of nodes with the longest runtime duration; and
determining the position of one or more node blocks in the performance visualization based on the critical path of nodes through the parallel dependency graph.

18. A system for generating a performance visualization of a parallel dependency graph in computer animation, the system comprising:
a memory configured to store data; and
a computer processor configured to:
receive a data file comprising a plurality of runtime evaluation entries for a plurality of nodes of a parallel dependency graph, wherein runtime evaluation entries comprise a node identification and a runtime duration;

determine a concurrency level for each node of the plurality of nodes of the parallel dependency graph based on a number of concurrently executing nodes in the data file;

generate a node block for each node of the plurality of nodes;

determine a size for each node block based on the runtime duration of a respective node;

determine a position along at least one axis for each node block based on the concurrency level of a respective node, wherein positions along the at least one axis of node blocks represents the concurrency level of respective nodes; and generate a performance visualization of the parallel dependency graph with one or more entire node blocks with the respective determined size and at the respective determined position along the at least one axis.

19. The system of claim 18, wherein determining the position of the node blocks comprises:

determining the vertical position of the node block based on the concurrency level determined for the corresponding node.

20. The system of claim 18, the computer processor further configured to:

determine a critical path of nodes through the parallel dependency graph by determining, from the data file, a chain of nodes with the longest runtime duration; and determine the position of one or more node blocks in the performance visualization based on the critical path of nodes through the parallel dependency graph.

21. A computer-implemented method for generating a performance visualization of a multithreaded computer program, the method comprising:

receiving a data file comprising a runtime evaluation entry for a plurality of processes of a multithreaded computer program, wherein the runtime evaluation entry comprises a process identification, a start time, and a stop time;

determining a concurrency level for each process of the plurality of processes of the multithreaded computer program from the number of concurrently executing processes in the data file;

generating a process block for each process of the plurality of processes;

determining a size for each process block based on the start time and the stop time of a respective process;

determining a position along at least one axis for each process block based on the concurrency level of a respective process, wherein positions along the at least one axis of process blocks represents the concurrency level of respective processes; and generating a performance visualization of the multithreaded computer program with one or more entire process blocks with the respective determined size and at the respective determined position along the at least one axis.

22. The computer-implemented method of claim 21, wherein determining the position of the process blocks comprises:

determining the vertical position of the process block based on the concurrency level determined for the corresponding process.

23. The computer-implemented method of claim 21, further comprising:

determining a critical path of processes through the multithreaded computer program by determining, from the data file, a chain of processes with the longest runtime duration; and determining the position of one or more process blocks in the performance visualization based on the critical path of processes through the multithreaded computer program.

* * * * *